May 14, 1963   F. HELBIG ETAL   3,089,251
TREATMENT CHAMBER FOR MATERIAL IN A FLUIDIZED STATE
Filed June 4, 1959   4 Sheets-Sheet 1

INVENTORS
Fritz Helbig
Walfred W. Jukkola
BY Theodore M. Jaflon
ATTORNEY

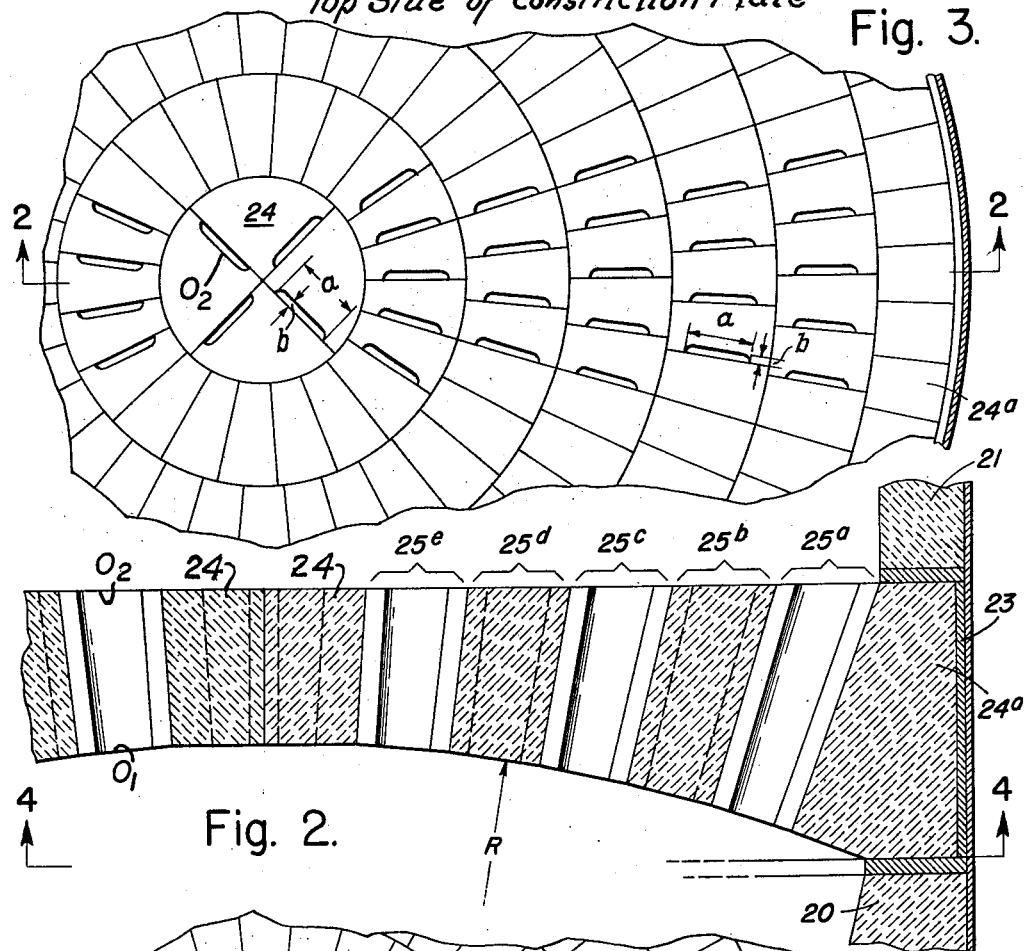
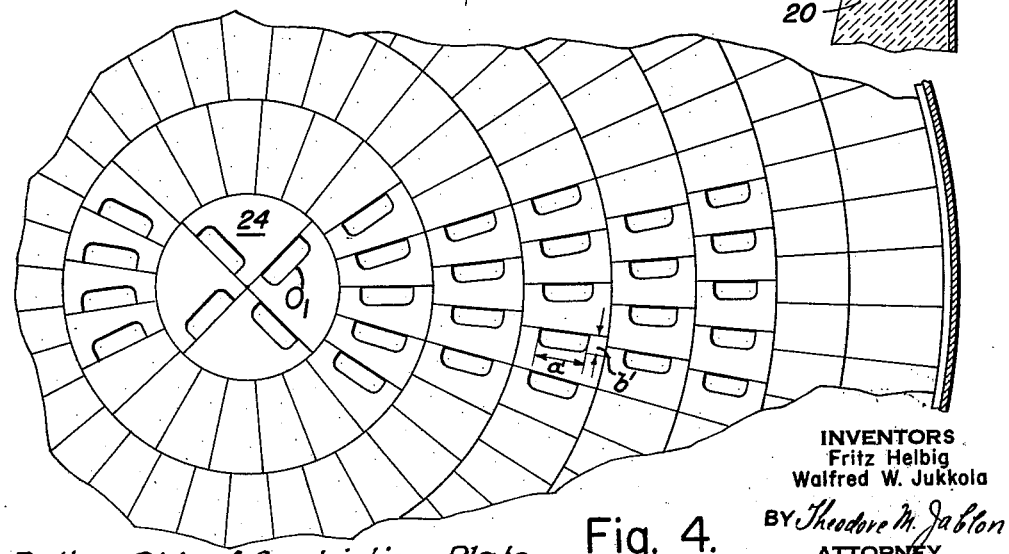

Fig. 9.
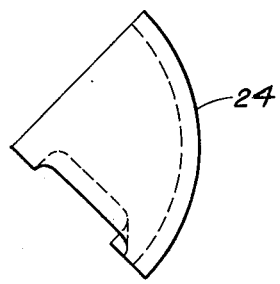
Fig. 6.
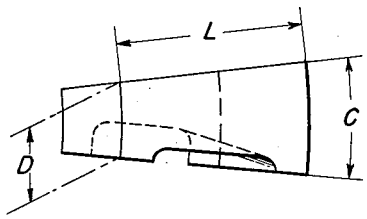
Fig. 8.
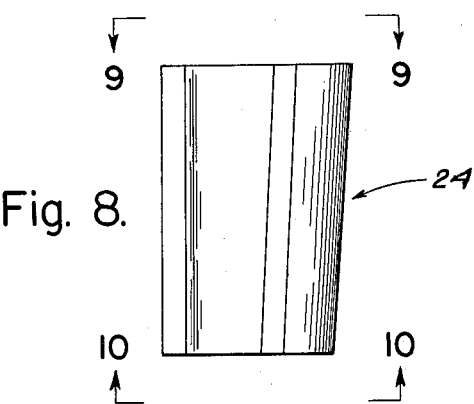
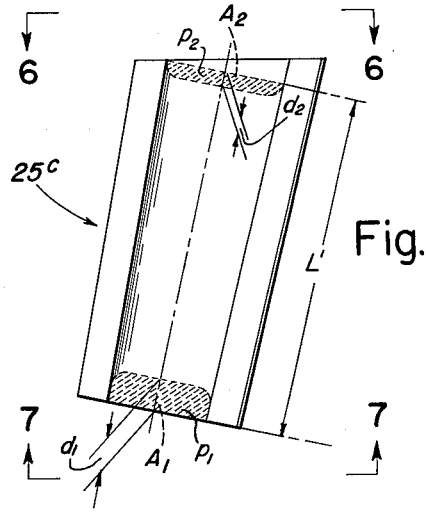
Fig. 5.
Fig. 10.
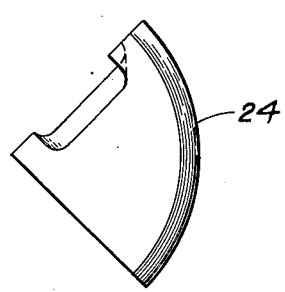
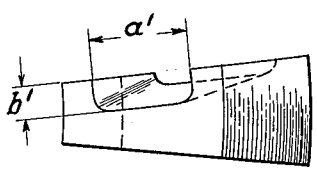
Fig. 7.
INVENTORS
Fritz Helbig
Walfred W. Jukkola
BY Theodore M. Jablon
ATTORNEY May 14, 1963   F. HELBIG ETAL   3,089,251
TREATMENT CHAMBER FOR MATERIAL IN A FLUIDIZED STATE
Filed June 4, 1959   4 Sheets-Sheet 4

INVENTORS
Fritz Helbig
Walfred W. Jukkola 3,089,251
Patented May 14, 1963

3,089,251
TREATMENT CHAMBER FOR MATERIAL IN A FLUIDIZED STATE
Fritz Helbig, Stamford, and Walfred W. Jukkola, Westport, Conn., assignors to Dorr-Oliver Incorporated, Stamford, Conn., a corporation of Delaware
Filed June 4, 1959, Ser. No. 818,127
20 Claims. (Cl. 34—57)

This invention relates to apparatus providing a treatment chamber adapted for the heat treatment therein of particles of material in a fluidized state, fluidization treatment of itself being well known as the formation of a dense, turbulent, liquid-like, thermally homogeneous suspension of particles in an upflowing stream of treatment gas, which formation is commonly referred to as a fluidized bed.

More particularly, this invention relates to that part of a fluidizing treatment unit, known as the constriction plate upon which the fluidized bed is maintained by a stream of hot treatment gases passing from the windbox upwardly through the flow passageways or ducts of the plate construction into the treatment chamber. For purposes of this invention, the constriction plate construction consists of a refractory material such as to resist high temperatures of the treatment gases, for example as applied in drying coal particles obtained from a coal washing operation. The treatment gases may be provided in the form of a combustion gas delivered into the windbox by a burner, and air may be admixed in a zone between the burner and the constriction plate for the purpose of controlling the operating temperature of the treatment gas, which under extreme conditions may reach about 2,500° F., but which for the aforementioned coal drying purpose may be in the order of about 1,500° F.

The constriction plate construction herein contemplated comprises a self-supporting structure of refractory material having a planar top face and a bottom face dome-shaped or arched in cross-section. In the embodiment herein shown illustrating the invention, the constriction plate construction is composed of concentric rings of refractory block units shaped and assembled in such a way that together they constitute a self-supporting dome with gas upflow passageways or ducts suitably distributed therein. That embodiment has a concave or spherical bottom surface and a planar top surface, the planar top surface being adapted for maintaining a fluidized bed of uniform depth throughout. Furthermore, in order to maintain uniform fluidizing conditions in the bed, it is also necessary that the fluidizing gas be uniformly distributed over the area of the bed by the constriction plate through the upflow passage ducts therein.

It is among the objects of the invention to provide a refractory constriction plate construction where proper distribution of the gases is insured in order to provide uniform fluidization of the bed, and to obtain the desired chemical and/or physical reactions and effects throughout the bed. More particularly, for the heat treatment of heat sensitive solids such as coal, the horizontal planar top face of the constriction plate should have a minimum of dead area which should be smooth for easy cleaning during shutdown.

However, in this respect a problem presents itself, particularly under the operating conditions herein exemplified by the coal drying operation, insofar as the vertcial block thickness of the constriction plate construction in-creases from a minimum at the middle portion to a maximum at the marginal portion thereof, so that the effective flow lengths of the upflow passageways or ducts and hence their through flow characteristics vary accordingly.

The minimum thickness in the middle of the arched or dome construction in turn is predicated upon the fact that the weight of the block units of minimum height be at least sufficiently great to resist upward gas pressure resulting from the pressure drop across the constriction plate, which is the differential between the pressures below and above the constriction plate, required for maintaining the desired fluidized state of the particles in the bed.

With these differences between the axial lengths of the ducts the problem of equal gas flow distribution becomes all the more critical where flow controlling attachments such as specially dimensioned bubble caps cannot or should not be employed for equalizing such differences. Such bubble caps are usually imposed upon oversized duct passages, so constructed and dimensioned as to allow only for the flow therethrough of the required gas volume from each passage thus to insure uniform gas distribution across the bed area. However, such bubble caps constitute an expensive item, especially when manufactured of special heat resistant steel to withstand high operating temperatures in the ranges above mentioned. Also the space requirements of such corrective bubble caps may be prohibitive where a large volume of treatment gas is required for maintaining the required fluidizing conditions, that is where as in the aforementioned coal drying operation a great many orifices are to be closely spaced with respect to one another, to accommodate the required gas volume.

Minimum spacing between the passages or ducts in turn is important in order to minimize the chances of residual material, for example, caked or coked coal, remaining settled in the area between the top orifices of the ducts. Bubble caps projecting from the planar top face of the constriction plate present an obstruction where it is desired that the top face be swept clean at intervals of any deposited material that might tend to cake and eventually to block or affect the free gas flow through the gas passages or ducts in the constriction plate.

Under such conditions, it is a problem to accommodate a desired large number of gas flow passageways or ducts by providing a correspodingly large number of relatively small block units to constitute a predetermined bed area, reducing to a minimum the spacing between the ducts, and having the discharge areas of the ducts as well as their discharge rates substantially alike over the entire bed area, thus avoiding the use of the expensive and space consuming bubble caps or the like.

According to the invention, the solution to the foregoing problems is found for instance in a constriction plate construction preferably comprising refractory block plate construction preferably comprising refractory block units shaped and assembled so as to constitute together a self-supporting structure which is arched in cross-section, and wherein tapered ducts are preferably provided at the interfaces of contiguous blocks, the ducts being so shaped and arranged as to admit substantially equal streams or equal predetermined volumes of treatment gas, with the narrow upper ends of the ducts constituting the outlet ends thereof.

According to the invention, this equalizing effect with respect to gas distribution and with respect to accommodating the required total of gas passage area in a large number of ducts without necessitating the use of bubble caps or the like, is attained in a simple and economical manner whereby the effective outlet areas of the tapered ducts can be made substantially alike, even as the effects of the length differentials in the ducts are cancelled out or compensated for. Preferably, the ducts formed by lateral recesses in the block units, are of flattened configuration with outlet orifices elongated along the respective interfaces, thus favoring a closely spaced arrangement of the orifices, so that a large number of ducts can be accommodated into a given area. The angle of convergence in the taper of these ducts is determinable for instance in a plane extending substantially transversely of the respective contiguous blocks and substantially containing the longitudinal axis of the respective duct.

According to the invention uniform gas distribution is obtainable where the ratio of the sizes of the effective inlet areas to the size of the effective discharge areas of the respective ducts is in a range substantially from about 1.5:1 to about 3:1 and may be in the order of an average preferably about 2.0:1, with the axial duct length being in a range from about 9″ to about 18″ as measured between the effective inlet and outlet areas of the ducts, where the angle of convergence may be from about 2° to about 4½°.

Furthermore, according to tests underlying the invention, for a known gas volume per duct the required effective transverse outlet area $A_2$ extending in a plane substantially normal to the axis of the duct can be determined on the basis of a venturi flow energy formula as follows:

$$Q_{T\ \&\ P} = 4825 \cdot C_m \cdot A_2 \sqrt{\frac{(\Delta P_{T\&P}) \cdot T}{M_w \cdot P}}$$

where:

$Q_{T\ \&\ P}$ = gas flow at operating temperature and operating pressure (in cubic feet per minute);
$C_m$ = discharge co-efficient of ducts;
$A_2$ = true discharge area of ducts (in square feet);
$\Delta P_{T\ \&\ P}$ = pressure drop between inlet and discharge duct areas for gas at operating temperature and operating pressure (in inches $H_2O$);
$T$ = operating gas temperature (in degrees Kelvin, i.e., °K. = °C. + 273.1);
$P$ = average of absolute pressures taken on opposite sides of constriction plate (in pounds per square inch);
$M_w$ = mol. weight of fluidizing gases.

wherein the orifice factor $C_m$ must be taken at the value revealed by the tests.

Thus, the ducts may have a slender taper or angle of convergence, such as were found to be applicable by the tests, whereby these ducts may be accommodated in a predetermined area of the fluidized bed.

In this way, the invention provides a general denominator for the construction of improved dome-shaped or arched constriction plates insuring uniform gas distribution whereby it is only necessary to determine the effective transverse outlet area of the duct for instance in the manner above set forth and to observe the aforementioned qualifications relative to the shape of the ducts. For instance, in the example of the dome-shaped constriction plate, after a desired number of rings have been chosen, each consisting of a desired number of block units of predetermined size and shape, bearing in mind the desired close spacing between the ducts to minimize the dead area, and after the required effective outlet area extending transversely of the longitudinal axis of the ducts may have been determined as above prescribed, then the shape of the tapers of the ducts may be fitted into this arrangement while observing the limits of the shape qualifying factors above set forth for the ducts. The result is that all the effective outlet areas of the ducts will be substantially alike in size and in configuration, that the spacing between the orifices of the ducts will then be a minimum, and that the rate of gas discharge will be alike for all the ducts irrespective of those variations in the axial lengths.

Other features and advantages will hereinafter appear.

The novel features which are considered as characteristic of the invention are set forth in particular in the appended claims. The invention itself, however, both as to its construction and its method of operation, together with additional objects and advantages thereof will be best understood from the following description of a specific embodiment when read in connection with the accompanying drawings, in which:

FIG. 2 is a fragmentary view of the constriction plate of FIG. 1 greatly enlarged;

FIG. 3 is a top view taken on line 3—3 of FIG. 1, of the constriction plate showing more particularly the improved arrangement of the gas passage ducts of the constriction plate according to one embodiment of the invention;

FIG. 4 is a bottom view of the constriction plate taken on line 4—4 of FIG. 2;

FIG. 5 is a detail side view of one embodiment of wedge-shaped blocks constituting the concentric rings in the constriction plate, viewing the recessed side of the block;

FIG. 6 is a top view of the wedge-shaped block, taken on line 6—6 of FIG. 5;

FIG. 7 is a bottom view of the wedge-shaped block taken on line 7—7 of FIG. 5;

FIG. 8 is a detail side view of one of the quadrant-shaped blocks located in the center of the dome construction, viewing the same from the recessed side thereof;

FIG. 9 is a top view of the quadrant-shaped block taken on line 9—9 of FIG. 8;

FIG. 10 is a bottom view of the quadrant-shaped block taken on line 10—10 of FIG. 8;

Figure 1:
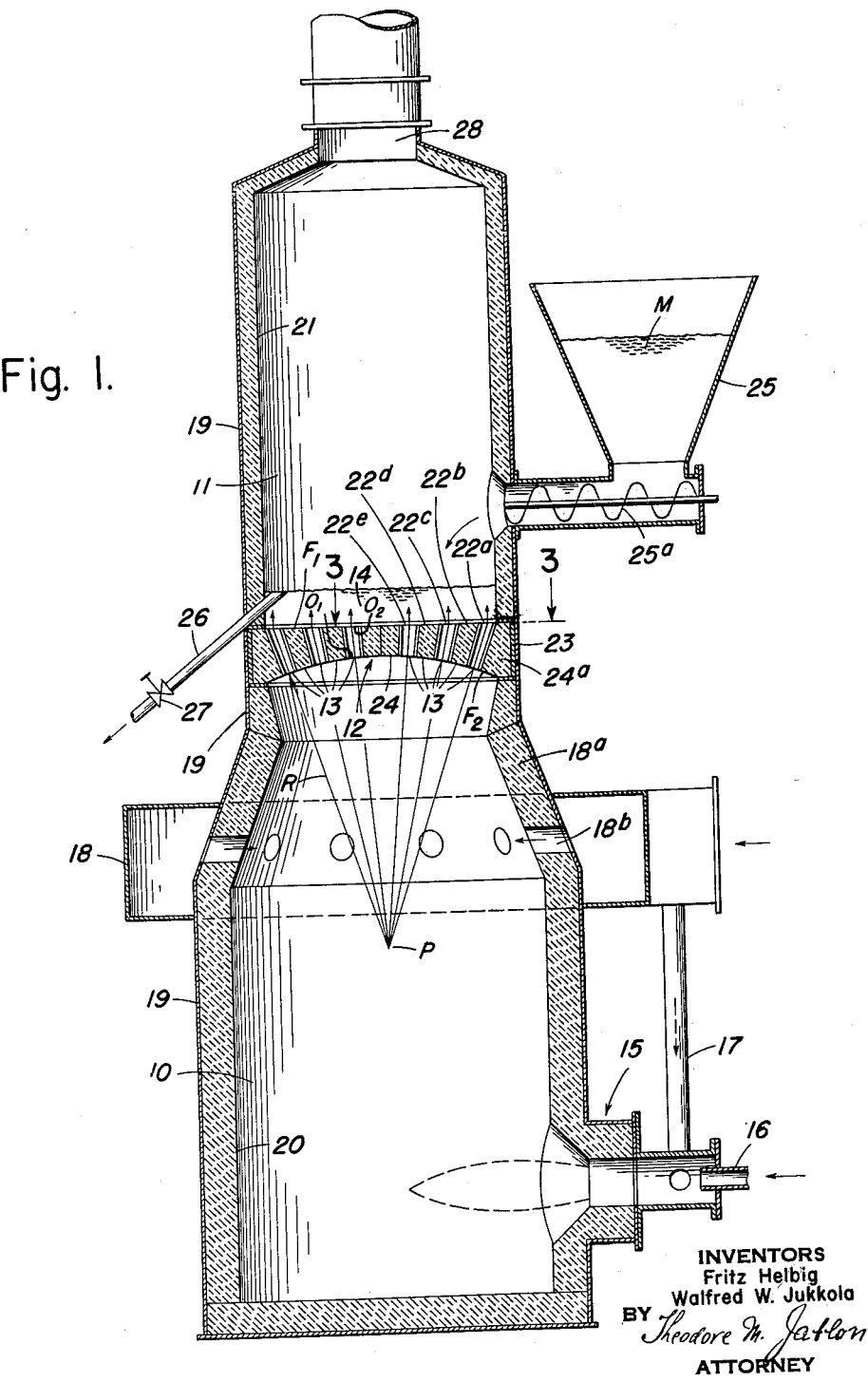
FIG. 1 is a vertical sectional view of one embodiment of the treatment apparatus employing a refractory constriction plate construction embodying the invention.

The treatment apparatus or unit as shown in the example of FIG. 1 embodying the invention comprises a dome-shaped refractory constriction plate having a planar surface at the top and a spherical or concave surface at the bottom. Since the dome construction of the example consists largely of concentric rings of block units shaped to constitute a self-sustained dome construction, the upflow gas passages or ducts in this constriction plate are shown substantially oriented axially relative to the center of the spherical bottom face of the constriction plate.

The treatment unit illustrated in FIG. 1 to embody one example of the invention, is a single stage treatment unit suited to carry out a heat treating operation wherein hot fluidizing gas passes from below upwardly through the constriction plate, for example as applied in the drying of particles or granules of coal such as may be obtained from the coal washing operation. In a practical instance, the coal particles may be of a size up to about ¼ inch in diameter, requiring a flow volume or "space rate" of the fluidizing treatment gases sufficient to maintain such particles in suspension. A preferred operating temperature for such conditions herein contemplated is in the order of about 1500° F.

The treatment unit itself, as shown in the example of FIG. 1 may comprise a windbox 10 below, and a treatment chamber 11 above the constriction plate 12 which has gas upflow passageways or ducts 13 through which hot fluidizing gases from the windbox, such as combustion gases, are forced into the treatment chamber at a rate great enough to maintain the particles in a suspended or fluidized state as indicated by the fluidized bed 14 being maintained upon the planar top face $F_1$ of the constriction plate. The ducts 13 are convergingly oriented substantially relative to the center P of the spherical bottom face $F_2$ of the constriction plate or dome.

The windbox 10 itself as herein exemplified constitutes a combustion chamber, having a gas burner 15 or the like to produce the fluidizing treatment gases, a pressure supply for fuel such as gas or pulverized coal or the like, and a pressure supply for combustion air to the burner being indicated at 16 and 17 respectively. The air for the combustion of the fuel may be derived from a header or conduit 18 which surrounds the upper conically shaped portion 18a of the windbox 10, which portion has radially directed ports 18b spaced from one another along the periphery for the purpose of supplying additional air effective by dilution to reduce and adjust the temperature of the combustion gases to provide the operating temperature desired for the heat treatment operation. A blower for supplying air to the header need not be shown.

The treatment unit of FIG. 1 comprises a containing steel shell 19 wherein the windbox section has a refractory lining 20, and wherein the treatment section above has a lining of suitable material 21. The interposed constriction plate is composed of the specially shaped refractory sector blocks 13 arranged in rings 22a, 22b, 22c, 22d, 22e, specially shaped quadrant blocks 24 constituting the center portion of the constriction plate, and abutment blocks 24a arranged in a circle around the rings, all of said blocks constituting the self-sustaining dome construction contained in a separate steel ring 23, configurated to rest upon the refractory lining 20 of the windbox section within the shell.

A feed hopper 25 is kept filled with the granular material, for example by a supply of wet coal M, associated with a feed screw 25a for continuously supplying the material at the required rate into the treatment chamber for drying in the fluidized bed. Treated material, for example dried coal discharges from the treatment chamber continuously through an overflow outlet 26 via suitable control means, for example a valve indicated at 27. Spent treatment gases laden with the evaporated moisture from the coal escape from the treatment chamber as indicated by a stack or flue connection 28.

For purposes of illustrating and exemplifying the invention, a fluidized bed about 10 to 12 inches deep of suspended coal particles may be maintained by the hot fluidizing gases supplied in a volume to satisfy the required "space rate" of the operation where the gases may have an operating temperature in the order of 1500° F., entering the upwardly tapered ducts in the constriction plate. The pressure differential effective across the constriction plate may be in the order of 10 to 20 inches $H_2O$.

In a preferred arrangement herein illustrated, and particularly exemplified in the detail FIGS. 2, 3 and 4, the constriction plate may have an effective diameter of about 6 feet comprising the aforementioned five concentric rings or courses of refractory block units together with the quadrant blocks in the center and the abutment blocks along the periphery. In a preferred form, the refractory dome construction consists of a suitable number of blocks arranged in rings. Each block is formed with a tapered groove on at least one of the radial sides thereof to constitute an opening at the top providing the effective transverse outlet area $A_2$ (see FIG. 5) extending in a plane substantially normal to the axis of the duct and determinable in the manner taught by the invention, and an opening at the bottom representing the larger effective transverse inlet area $A_1$, extending in a plane substantially parallel to that of area $A_2$, these areas being particularly proportioned and dimensioned relative to each other, so that a maximum number of upwardly tapered gas flow passageways or ducts can be accommodated satisfying the requirements of minimizing the dead area and providing uniform distribution over the area of the bed of the gas volume required for maintaining the fluidizing or coal drying operation.

In a preferred form, each of the blocks has one lateral recess or groove which together with the plane side face of the adjacent or contiguous block forms the respective tapered duct.

Figures 11, 12:
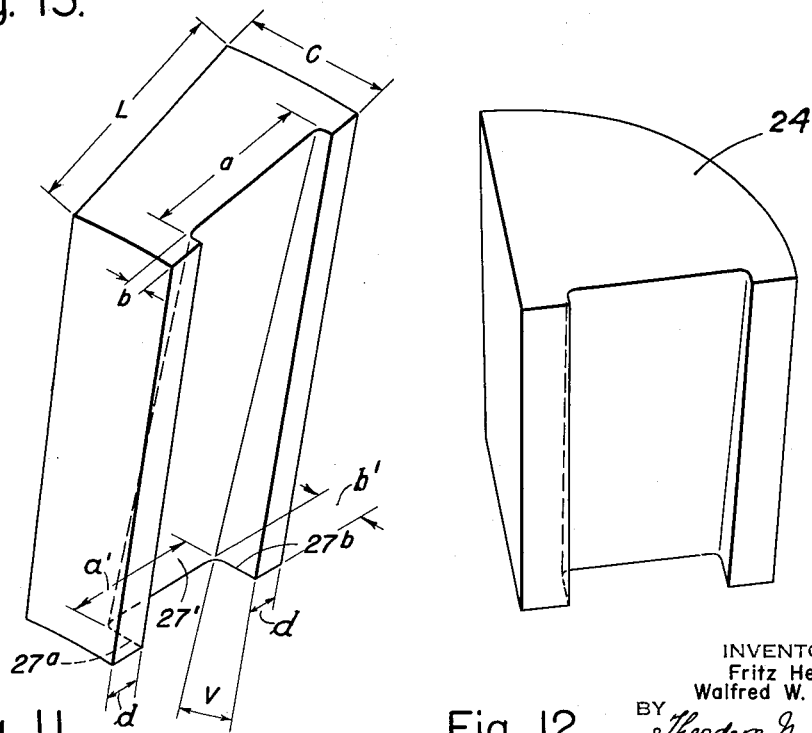
FIG. 11 is a perspective view of the wedge-shaped block unit illustrated in FIGS. 5–7.
FIG. 12 is a perspective view of the quadrant-shaped block unit illustrated in FIGS. 8–10.

The outlet areas $A_2$ (see FIG. 3) shown in the form of narrow slots directed radially relative to the vertical axis of the dome and definable by the radial dimension $a$ and the transverse dimension $b$, particularly lend themselves to the purposes of this invention, the larger inlet areas $A_1$ being similarly oriented as seen in FIG. 4 and definable by corresponding dimensions $a'$ and $b'$. The channel shaped recess or groove provided laterally in each block is, therefore, defined (see FIG. 11) by a flat bottom 27' and sides 27a and 27b, the bottom 27' sloping from the discharge end to the inlet end of the gas passage formed by this groove. Moreover, the flat bottom 27' of the groove constitutes with the cooperating plane side face of the adjoining block an angle of convergence V.

The duct areas $A_1$ and $A_2$ designate what are herein termed the effective transverse inlet area and the effective transverse outlet area respectively in so far as they extend in transverse planes that are substantially normal to the respective axes of the ducts, which axes in turn are convergingly oriented substantially relative to the center of the dome as clearly indicated in FIG. 1 wherein the spherical dome surface is defined by radius R. Such effective transverse inlet—and outlet areas as herein understood are illustrated in the projections $p_1$ and $p_2$ of these areas appearing in dot-and-dash lines in the detail of the block unit shown in FIG. 5. Accordingly, the effective axial length of the duct is definable by the length L as measured between the planes of the effective inlet and outlet areas of the duct. The duct has an inlet orifice $O_1$, and an outlet orifice $O_2$ (see FIGS. 2, 3, 4) located respectively in the concave bottom face and in the planar top face of the constriction plate. Since, for practical reasons, it is desirable that the horizontal width of the block units between the radial sides thereof should not fall below a minimum required by strength consideration of the blocks, it is clear that the larger inlet areas at the bottom should, among other factors, be considered as governing the size determinations of the block, preferably while providing a minimum distance of the outlet areas $A_2$ from one another. In this way, the dead area between orifices may be minimized, and a fluidizing gas volume sufficiently great such as needed in the coal drying operation, for example, may be provided through the sum total of these ducts. In order to have a minimum of dead area, the width of the blocks as measured along their respective circumferential lines C should be as narrow as is compatible with practical limitations of the blocks as based upon their material strength and other factors. A width of about 3" thus measured constitutes a practical dimension satisfying the strength requirements as well as suited for the coal drying operation herein exemplified. For other kinds of operation, however, this width of the blocks may be increased for instance to about 9" without impairing the performance. Consequently, preferred lengths L of the blocks as measured along the radial line are preferably in the range of 5 inches to 10 inches dependent somewhat upon the width as measured between the radial sides of the block. Preferably, for the coal drying or other similar operations, the blocks are chosen to be about 3 inches in width, and about 6 inches in the radial dimension as measured on the planar face of the constriction plate.

With the height or vertical thickness of the blocks increasing from the center towards the periphery of the dome, the vertical thickness or height of the center blocks is dependent upon the pressure conditions under which the treatment unit is to operate, as well as dependent upon the density or specific gravity of the refractory material of the blocks, for the reason that these blocks are held in place only by gravity that is their weight against the prevailing gas pressure differential applied for maintaining the fluidized condition of the bed. Thus, if the dome or constriction plate be constructed for a pressure differential of 20" $H_2O$, the center blocks should be of sufficient height to counter-balance the upward pressure which is the equivalent to:

$$\frac{20'' \cdot 144}{27.8} = 104 \text{ lbs. per sq. ft.}$$

of bed area, where 27.8 inches is the height of a water column having a cross-sectional area of one square inch that weighs 1 lb. Hence, if the density of the block be 140 lbs. per cu. ft., the center block or blocks must be about 9″ thick. Therefore, if it is considered that the rise of the dome may have increments of say 1″ to 2″ for each additional foot of the span, the height of the blocks in a dome of say about 7 foot diameter, will increase from a thickness from about 9″ at the center to anywhere from 14″ to 21″ at the periphery. The corresponding increases in the axial length of the gas passageways or ducts would normally entail corresponding changes in through-flow characteristics of these gas passages.

However, according to the invention, as revealed by certain tests set forth below, the effect of irregularities relative to the through-flow characteristics is eliminated in a simple manner by the improved construction of the constriction plate, which makes it unnecessary to calculate the effective through-flow areas of the ducts separately for each of the concentric rings of blocks that constitute the constriction plate.

The tests were conducted on test arrangements of tapered ducts simulating those desired in the constriction plate to meet the special conditions and operating requirements above set forth. The through-flow volume Q for the duct assemblies was introduced in the aforementioned flow energy formula:

FORMULA I $$Q_{T\&P} = 4825 \cdot C_m \cdot A_2 \sqrt{\frac{(\Delta P_{T\&P}) \cdot T}{M_w \cdot P}}$$

which formula was evaluated towards determining the only variable, namely, the discharge co-efficient $C_m$.

To this end the test procedure itself consisted primarily in determining the pressure differential across the respective test duct assemblies, for a test run with various flow rates applied, and substantiated in the tabulations shown below.

Five tapered test duct arrangements designated as Nos. 1–5 simulating those desired in the constriction plate were thus tested. These ducts had slot-shaped discharge areas and correspondingly shaped, although larger inlet areas, with one pair of sides constituting the ends of the slot substantially parallel to one another and the other pair of sides substantially defining between them the angle of convergence in these ducts. These test ducts Nos. 1–5 had differential axial lengths, namely 9″ and 18″ respectively, different angles of convergence, and different ratios of $A_1/A_2$ of the effective inlet areas to the effective discharge areas of the ducts. These test ducts were prepared by cementing together ½″ thick slabs of refractory such as Varnon or similar refractory material. These slabs were first cemented together on a wooden form defining the shape of the desired gas passageway or duct, and the cemented assembly of the slabs then placed into a corresponding length of pipe, where upon castable was rammed around the assembly in the pipe. A source of air pressure as from a blower was connected to this pipe so as to supply variable operating pressure at the inlet end of the duct representing the larger inlet area $A_1$, while the opposite end of the pipe with the smaller area representing the outlet area $A_2$ was connected to a flow meter which supplied readings of the through-flow volume Q at varying supply pressures and thus at varying pressure differentials measurable across the duct, that is between the inlet and the outlet end thereof. To satisfy the above formula the molecular weight of the air may be taken as equal to that of the hot fluidizing gases including the gaseous combustion products as above set forth. These tests reveal that the discharge co-efficient $C_m$ determinable as above set forth will not change within the limits of the axial length of gas passages or ducts, or by changes within suitable limits of the slender angle of convergence of the taper of the ducts, and where the area ratio of $A_1/A_2$ is in a range from about 1.5:1 to about 3:1 and may be of an average 2:1. All the test ducts had relatively rough surfaces, particularly at the corners, and narrow sides at the ends of the slots, so that the test results may be considered as within normal experimental accuracy.

The findings of this invention are therefore tantamount to the discovery that within limits suited to satisfy the above operating conditions, the shape of the duct itself may be varied as to length and area ratio $A_1/A_2$ even though the effective discharge area $A_2$ will remain unchanged for the ducts. Hence, the constriction plate according to this invention will have identical effective discharge areas at the top, which areas may be closely spaced. Yet, the ducts themselves may be differently shaped as to length and area ratio so they will fit themselves into the desired dome construction and be in accordance with the aforementioned size determinations of the blocks, the ducts will deliver fluidizing gas uniformly for the entire fluidized bed. Moreover, this arrangement is capable of delivering a gas volume large enough to satisfy the requirements of the coal drying operation or the like such as herein exemplified.

In view of the findings underlying the invention, the improved constriction plate is definable as having duct outlet areas of uniform size and configuration closely and uniformly spaced to minimize the dead areas as well as to provide uniform gas distribution and to supply the gas at the required rate, where the discharge area $A_2$ is determinable by evaluating the above flow energy formula towards the variable "$A_2$." Furthermore, the discharge coefficient $C_m$ should be in the order of 0.9, the area ratio of the ducts $A_1/A_2$ from about 1.5:1 to about 3:1, and the length of the ducts from about 9″ to about 18″. The area ratio may be of an average 2:1, and the angle of convergence of the taper of the ducts may be from about 2° to about 4½°. With these qualifications it is possible to accommodate gas passages or ducts of varying tapered shapes within a minimum of bed area as well as within the limits of the size determinations of the blocks, for instance, by varying the angle of convergence of the gas passages dependent upon the axial length as well as dependent upon the required area ratio $A_1/A_2$ above defined, without affecting the through-flow rate and thus without affecting the uniform distribution of the fluidizing gas over the area of the constriction plate.

Figure 13:
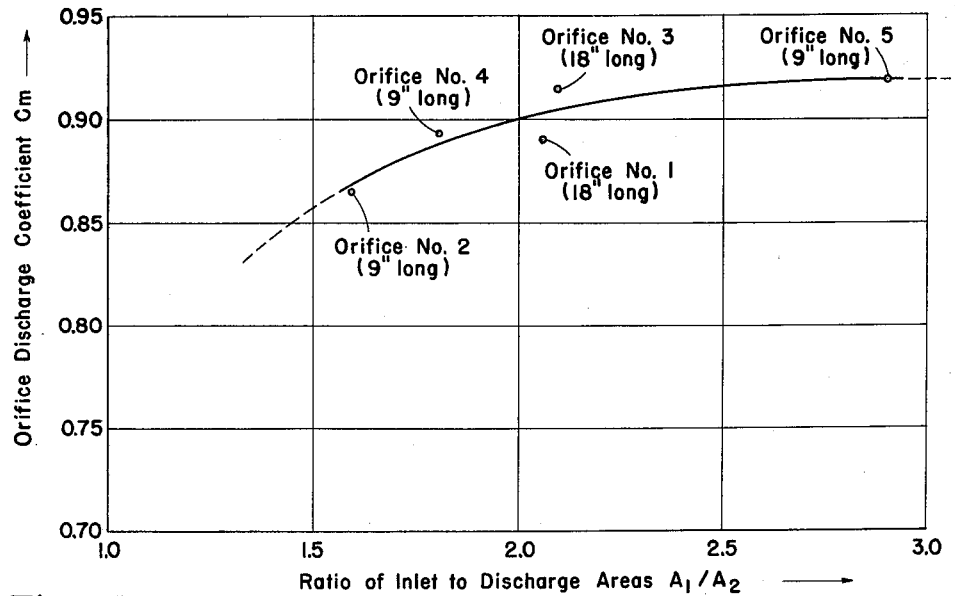
FIG. 13 is a graph showing a test curve supporting the invention.

The above improvement in the constriction plate is substantiated by the following test tabulations taken in conjunction with the curve of FIG. 13 which resulted from this test investigation:

The five test duct arrangements Nos. 1–5 are identified as follows:

*Tabulation I*

TEST DUCT NO. 1

Length: 18 inches
Inlet area $A_1$: 4.30·1.15=4.94 sq. inches
Dischg. area $A_2$: 4.09·0.59=2.41 sq. inches

TEST DUCT NO. 2

Length: 9 inches
Inlet area $A_1$: 4.10·1.04=4.26 sq. inches
Dischg. area $A_2$: 4.09·0.66=2.70 sq. inches

TEST DUCT NO. 3

Length: 18 inches
Inlet area $A_1$: 4.09·1.21=4.95 sq. inches
Dischg. area $A_2$: 4.10·0.58=2.38 sq. inches

TEST DUCT NO. 4

Length: 9 inches
Inlet area $A_1$: 4.08·1.09=4.45 sq. inches
Dischg. area $A_2$: 4.04·0.62=2.50 sq. inches

TEST DUCT NO. 5

Length: 9 inches
Inlet area $A_1$: $4.09 \cdot 1.05 = 4.30$ sq. inches
Dischg. area $A_2$: $4.10 \cdot 0.36 = 1.475$ sq. inches A suitable test run applied to the above test duct No. 5, and leading to the determination of the discharge coefficient $C_m$, is exemplified as follows:

*Tabulation II*

| Q Gas flow rate from flow meter readings | | P Pressure of gas at inlet end of duct from gauge readings | | ΔP Gas pressure diff. from gauge readings | | T Temperature | | $C_m$ Orifice co-efficient |
|---|---|---|---|---|---|---|---|---|
| Percent* | Converted to standard cu. ft./min. | mm./Hg | Converted to lb. sq. in. | in. $H_2O$ | Converted to lb. sq. in. | °F. | °C. | $C_m$ |
| 25.0 | 43.5  | 73 | 1.41 | 1.3  | 0.05 | 86 | 30 | 0.937 |
| 34.0 | 59.2  | 73 | 1.41 | 2.6  | 0.09 |    |    | 0.923 |
| 43.0 | 75.0  | 73 | 1.41 | 4.1  | 0.15 | 92 | 33 | 0.926 |
| 51.0 | 88.8  | 73 | 1.41 | 5.6  | 0.20 |    |    | 0.928 |
| 57.0 | 99.2  | 73 | 1.41 | 7.0  | 0.25 |    |    | 0.935 |
| 63.0 | 110.0 | 73 | 1.41 | 8.6  | 0.31 |    |    | 0.935 |
| 68.8 | 118.5 | 73 | 1.41 | 10.1 | 0.36 | 97 | 36 | 0.922 |
| 73.5 | 128.0 | 73 | 1.41 | 12.0 | 0.43 |    |    | 0.897 |
| 78.5 | 136.8 | 73 | 1.41 | 13.6 | 0.49 | 99 | 37 | 0.889 |
| 72.5 | 126.0 | 73 | 1.41 | 11.5 | 0.41 |    |    | 0.918 |
| 62.0 | 108.0 | 73 | 1.41 | 8.4  | 0.30 |    |    | 0.918 |
| 51.0 | 89.0  | 73 | 1.41 | 5.7  | 0.21 | 99 | 37 | 0.892 |
| 38.0 | 66.0  | 73 | 1.41 | 3.2  | 0.12 |    |    | 0.915 |
| 29.0 | 50.5  | 73 | 1.41 | 1.8  | 0.06 |    |    | 0.934 |
| 22.0 | 38.3  | 73 | 1.41 | 1.1  | 0.04 | 99 | 37 | 0.906 |
|      |       |    |      |      |      |    |    | Avg. 0.920 |

*Percent of flow meter capacity where 100% represents 174 standard cubic feet per minute. For example 25% flow meter reading is equivalent to $0.25 \cdot 174 = 43.5$ standard cubic feet per minute (see first Q-value in Tabulation II above).

As shown in the last column of Tabulation II, the discharge co-efficient $C_m$ was determined for various flow rate meter readings Q taken at different gas pressure differentials ΔP by evaluating $C_m$ in the aforementioned flow energy equation for a venturi, Formula I: $Q_{T \& P} = 4825 \cdot C_m \cdot A_2 \sqrt{\dfrac{(P_{T \& P}) \cdot T}{M_w \cdot P}}$ Taking for example the data of the seventh reading in the Tabulation II as an example for $Q = 118.5$ cu. ft./min. (standard), the determination of the respective $C_m$ value is arrived at by the following procedure:

$$Q_{T \& P} = 4825 \cdot C_m \cdot A_2 \sqrt{\dfrac{(\Delta P_{T \& P})(T)}{M_w \cdot P}}$$

$Q_{T \& P} = 118.5$ standard cu. ft./min.
$T = 36° + 273 = 309°$ Kelvin
$M_w = 29$ mol. weight of air
$P = 15.93$ lbs./sq. in. is average of absolute pressures before and after orifice.

P is determined as follows:

Atmospheric pressure = 14.7 lbs./sq. in. or 760.0 mm./Hg absolute
Pressure before orifice = 73 mm./Hg or 1.41 lbs./sq. in. gauge because:

$$\dfrac{73 \text{ mm./Hg}}{760 \text{ mm./Hg}} \times 14.7 = 1.41 \text{ lbs./sq. in.}$$

1 lb./sq. in. = 27.7 inches $H_2O$ and since:

$$\Delta P = 10 \text{ in. } H_2O = \dfrac{10}{27.7} = 0.36 \text{ lbs./sq. in. gauge}$$

Pressure (from Tabulation II, seventh reading)
Absolute pressure before orifice = 14.7 + 1.41 = 16.11 lbs./sq. in.
Absolute pressure after orifice = 16.11 − 0.36 = 15.75 lbs./sq. in.

so that average absolute pressure $$= \dfrac{16.11 + 15.75}{2} = 15.93 \text{ lbs./sq. in.}$$

Therefore:

$$Q_{T \& P} = 118.5 = 4825 \cdot C_m \cdot \dfrac{1.475}{144} \sqrt{\dfrac{10 \cdot 310}{29 \cdot 1593}}$$

$= 4825 C_m \cdot (.01025) \cdot 2.9$ $= 128 \cdot C_m$ $C_m = 0.922$

The average of all $C_m$ values thus arrived at in Tabulation II is $C_m = 0.920$.

All the other $C_m$ values noted in the last column of the above Tabulation II may then be arrived at in a corresponding manner, as a result of which it is noted that all the $C_m$ values average at 0.922 which is close to the value of 0.9 which in turn was found as an average of all the net $C_m$ values obtained from similarly testing and evaluating the test ducts Nos. 1–4.

In other words, corresponding test tabulations have been obtained from test runs on the other orifices Nos. 1–4, leading similarly to respective determinations of the respective average discharge co-efficients $C_m$ for the respective test ducts.

The net result of the $C_m$ determinations for the respective test ducts Nos. 1–5 may then be tabulated in the following manner:

*Tabulation III*

| Test Duct Arrangement Number | $A_1$ inlet Area of Ducts in sq. in. | $A_2$ Dischg. Area of Ducts in sq. in. | $A_1/A_2$ Area Ratio | $C_m$ Avg. Dischg. co-efficient of Ducts | V Angle of convergence in Ducts | L Length of Ducts between inlet and outlet areas in inches |
|---|---|---|---|---|---|---|
| 1 | 4.94  | 2.41  | 2.05 | 0.88  | 1°-47′ | 18 |
| 2 | 4.26  | 2.70  | 1.58 | 0.836 | 2°-25′ | 9  |
| 3 | 4.95  | 2.38  | 2.08 | 0.915 | 2°-2′  | 18 |
| 4 | 4.46  | 2.50  | 1.79 | 0.895 | 3°-0′  | 9  |
| 5 | 4.28  | 1.475 | 2.90 | 0.922 | 4°-24′ | 9  |

The discharge co-efficients $C_m$ of the test orifices Nos. 1–5 from the above Tabulation III are plotted against the respective ratios $A_1/A_2$ also taken from the above Tabulation III and the resulting curve (see FIG. 13) reveals the fact that, if the inlet area $A_1$ is made about twice the size of the discharge area, then the discharge co-efficient $C_m$ remains constant at about 0.90 applicable for all practical purposes of the invention, and thus forming the basis for the construction of the improved constriction plate.

The invention is further substantiated by the following practical example of a constriction plate constructed in accordance with the teachings of this invention for use in a coal drying unit having a capacity of 100 tons of wet coal per hour:

EXAMPLE

*Coal Drying Unit Having a Capacity of 100 Tons of Wet Coal Per Hour*

Bituminous coal, mesh sizes between ⅜″ and 0, is to have its moisture reduced from 8% to 2½%, with drying temperature in the fluidized bed maintained at 160° F. and the stack gas temperature at 150° F., with windbox pressure at 40″ $H_2O$ or 1.5 lbs./sq. in., and pressure differential before and after constriction plate of 10″ $H_2O$.

DETERMINABLE DATA

*Windbox temperature*: 1380° F. or 749° C.
*Volume of drying gas*: $Q_{T \& P} = 42,800$ cu. ft./minute at 1380° F. and 1.5 lbs./sq. in. gauge pressure.

*Volume of stack gas:* $S=20,200$ cu. ft./min. at 150° F. and 1 atm. requiring a bed of 28.1 sq. ft. or of 6 ft. diameter for a "space rate" of 12 ft./sec. (i.e., flow rate of the gases in the treatment chamber).

*Determination of Orifice Area $A_2$ in a Constriction Plate of 6 ft. Diameter According to the Findings in the Chart of FIG. 13 of the Drawings*

Choosing refractory sector blocks measuring 6″ radially, the center blocks and five surrounding rings of sector blocks can be accommodated in the bed area.

The average width of the blocks between their radial side faces and the total number of blocks and thus the total number of orifices, is then determined from a layout in which radius R of the center blocks is 6″ and the respective rings have radii $R_1$, $R_2$, $R_3$, $R_4$, $R_5$ respective increments of 6′ each so that the layout as seen from the top is representable by the following tabulation:

| Radii | Circumference, $2\pi r$, inches | Number of blocks in each ring | Size of Blocks, inches | | |
|---|---|---|---|---|---|
| | | | Inner peripheral width D | Outer peripheral width C | Radial length of blocks L |
| R | 37.6 | 4 | 0.0 | 9.4 | 6 |
| $R_1$ | 75.4 | 18 | 2.0 | 4.10 | 6 |
| $R_2$ | 113.0 | 31 | 2.43 | 3.65 | 6 |
| $R_3$ | 150.8 | 42 | 2.69 | 3.59 | 6 |
| $R_4$ | 187.8 | 53 | 2.84 | 3.55 | 6 |
| $R_5$ | 226.0 | 64 | 2.94 | 3.52 | 6 |

Total number of blocks, 212.
Therefore:

With gas flow through each orifice:

$$\frac{42,800 \text{ cu. ft./min.}}{212 \text{ blocks}} = 202 \text{ cu. ft/min.}$$

at 1380° F. or 749° C. and 1.5 lbs./sq. in. windbox pressure, orifice area $A_2$ determined from:

$$Q_{T\&P} = 4825 \cdot C_m \cdot A_2 \sqrt{\frac{(\Delta P_{T\&P}) \cdot T}{M_w \cdot P}}$$

with $P=10″$ $H_2O$ pressure differential across constriction plate
$C_m=0.9$ (according to curve, FIG. 13)
$Q_{T\&P}=202$ cu. ft./min.
$T=749°$ C.$+273°$ C.$=1022°$ Kelvin absolute temperature $$P=(14.7+1.5 \text{ lbs./sq. in.}) - \left(\frac{10″}{27.7″} \cdot \frac{1}{2}\right) \text{lbs./sq. in.}$$

$=16.02$ lbs./sq. in. absolute average pressures before and after constriction plate
$M_w=29$ mol. weight of air is $$Q_{T\&P} = 202 = 4825 \cdot 0.9 \cdot A_2 \sqrt{\frac{10 \cdot 1022}{29 \cdot 16.02}}$$

Hence, $A_2=0.00993$ sq. ft.
$=0.00993 \cdot 144 = 1.43$ sq. in.

If length of slot shaped duct discharge area $A_2$ is made 4″, then the width of the slot is $$\frac{1.43}{4} = 0.36″ = \text{approx. } \tfrac{3}{8}″$$

Therefore, acording to the invention and the curve in FIG. 13, the duct inlet area for an area ratio $A_1/A_2$ of 2:1 is $2 \cdot 1.43 = 2.86$ sq. in., so that the inlet area $A_1$ can be in the form of a slot shaped area 4″ · 0.715″, that is a slot 4″ long and about ¾″ wide.

The vertical thickness or height of the blocks will be in a range from about 9″ at the center to about 15″ at the walls if the rise for a dome of 6 ft. span is chosen to be 1″ for each ft. span. If the rise for a dome of 6 ft. span is chosen to be 2″ for each ft. of span, the height of the blocks will be in a range from about 9″ at the center to about 21″ at the periphery.

It will be understood that the invention is not limited to the dimensional qualifications of the foregoing example, but that the construction is variable as by extrapolation, depending for instance upon the diameter of the bed, the rise of the span, the spacing, number, arrangement, and configuration, as well as the lengths of the ducts. The ducts may be formed by recesses in both sides of the blocks, although in a preferred embodiment they are formed by a single recess and the plane side faces of the adjoining block.

The invention provides an improved and simplified constriction plate construction defined by a planar face at the top and arched or dome-shaped face at the bottom where the tapered ducts have uniform discharge areas throughout the bed, adapted to be closely spaced to minimize the dead area portions, yet with the ducts themselves so shaped that a large number of gas passages or ducts may be accommodated in a given area. The ducts themselves are effective to pass equal volumes of the fluidizing gas thereby insuring the uniform distribution throughout the bed irrespective of the differences in the respective lengths of the variously tapered ducts.

In brief, the invention provides a constriction plate or self-supporting arched or dome-shaped construction of great simplicity consisting of refractory material adapted to resist high temperatures. This construction features uniform discharge areas for the tapered ducts and the ducts so shaped and constructed that special flow equalizing means such as the bubble caps or other separate control means or devices become unnecessary for providing the desired uniform gas distribution in the bed.

We claim:

1. A constriction plate construction having gas passage ducts for maintaining a bed of particles in a fluidized state by an upflowing stream of treatment gases passing through said ducts, which comprises a plurality of concentric rings composed of refractory block units constituting together a self-supporting dome having a planar top face and a concave bottom face, said block units being shaped so as to constitute tapered ducts between the interfaces of contiguous blocks with the narrow ends of the ducts constituting the outlet ends, said ducts having different lengths increasing from a minimum length in the central portion of the constriction plate construction to a maximum in the marginal portion thereof, wherein the effective outlet areas of said ducts are substantially alike in the form of elongated outlet openings extending radially relative to the vertical axis of the dome, wherein further the ratio of the sizes of the effective inlet area to the size of the effective outlet areas of the ducts is from about 1.5:1 to about 3:1, while the effective axial length of the ducts is in a range from about 9″ to about 18″, and wherein the tapered shape of the ducts has an angle of convergence from about 2° to about 4½° determinable in a plane extending substantially transversely of said elongated openings and substantially containing the longitudinal axis of the ducts, whereby with sufficient gas pressure drop maintained across said constriction plate construction there is maintainable uniform gas flow distribution through said ducts.

2. The constriction plate construction according to claim 1, wherein the outlet area of the ducts is determinable from the formula:

$$Q_{T\&P} = 4825 \cdot C_m \cdot A_2 \sqrt{\frac{(\Delta P_{T\&P}) \cdot T}{M_w \cdot P}}$$

Where:
$Q_{T\&P}$=gas flow at operating temperature and operating pressure (in cubic feet per minute);
$C_m$=discharge co-efficient of ducts;
$A_2$=true discharge area of ducts (in square feet);

$P_{T\ \&\ P}$=pressure drop between inlet and discharge duct areas for gas at operating temperature and operating pressure (in inches H₂O);

$T$=operating gas temperature (in degrees Kelvin, i.e., °K.=°C.+273.1);

$P$=average of absolute pressures taken on opposite sides of constriction plate (in pounds per square inch);

$M_w$=mol. weight of fluidizing gases;

wherein $C_m$ is in the order of 0.9.

3. The constriction plate construction according to claim 1, wherein said block units have in one radially extending side face thereof a channel shaped recess the effective end cross-sections of which together with the adjacent plane side face of the respective contiguous block unit define the inlet area and the outlet area of said ducts.

4. The arrangement according to claim 1, wherein said block units have in one radially extending side face thereof a channel shaped recess the effective end cross-sections of which together with the adjacent plane side face of the respective contiguous block unit define the inlet area and the outlet area of said duct, and wherein the longitudinal edges of said recess are substantially parallel to the respective adjacent outer edges of the block unit, defining therewith respective lateral abutment portions having abutting relationship with the contiguous side face of the adjoining block unit.

5. The constriction plate construction according to claim 1, wherein said block units have in one radially extending side thereof a channel shaped recess the effective end cross-section of which together with the adjacent plane side face of the respective contiguous block unit define the inlet area and the outlet area of said ducts, said recess having a substantially flat face sloping from the respective long side of the elongated outlet opening.

6. The constriction plate construction according to claim 1, wherein said block units have in one radially extending side thereof a channel shaped recess the effective end cross-sections of which together with the adjacent plane side face of the respective contigous block unit define the inlet area and the outlet area of said ducts, said recess having a substantially flat face sloping from the respective long side of the elongated outlet opening so that the chordal height of the inlet area is about twice the transverse dimension of the outlet area.

7. The constriction plate construction according to claim 1, wherein said block units have in one radially extending side thereof a channel shaped recess the effective end cross-sections of which together with the adjacent side face of the respective contiguous block unit define the inlet area and the outlet area of said ducts, wherein the longitudinal edges of said recess are substantially parallel to the respective adjacent outer edges of the block unit, defining therewith respective lateral abutment portions in abutting relationship with the respective contiguous block unit, wherein the distance between the side faces of the block units is substantially smaller than the radial dimension between the inner and outer peripheral faces of these units, and wherein said concentric rings of the construction have substantially the same radial thickness when viewed from the top.

8. A constriction plate construction having gas passage ducts for maintaining a bed of particles in a fluidized state by an upflowing stream of treatment gases passing through said ducts, which plate construction comprises refractory block units shaped and assembled so as to constitute together a self-supporting structure having a planar top face and a bottom face arched in cross-section, said block units being shaped so as to constitute tapered ducts between the interfaces of contiguous blocks with the narrow ends of the ducts constituting the outlet ends thereof, said ducts having different lengths increasing from a minimum length in the middle portion of the constriction plate construction to a maximum in the marginal portions thereof, wherein the effective outlet areas of said ducts are substantially alike in the form of openings elongated along said interface, wherein the ratio of the sizes of the effective inlet areas to the size of the effective outlet areas of the ducts is from about ⅕:1 to about 3:1, while the effective axial lengths of the ducts is in a range from about 9″ to about 18″, and wherein the tapered shape of the ducts has an angle of convergence from about 2° to about 4½° determinable in a plane extending transversely of the elongated outlet openings and substantially containing the longitudinal axis of the ducts, whereby with sufficient gas pressure drop maintained across said constriction plate construction, there is maintainable uniform gas load distribution to said ducts.

9. The constriction plate construction according to claim 8, wherein the outlet area of the ducts is determinable from the formula:

$$Q_{T\ \&\ P}=4825 \cdot C_m \cdot A_2 \sqrt{\frac{(\Delta P_{T\ \&\ P}) \cdot T}{M_w \cdot P}}$$

Where:

$Q_{T\ \&\ P}$=gas flow at operating temperature and operating pressure (in cubic feet per minute);

$C_m$=discharge co-efficient of ducts;

$A_2$=true discharge area of ducts (in square feet);

$P_{T\ \&\ P}$=pressure drop between inlet and discharge duct areas for gas at operating temperature and operating pressure (in inches H₂O);

$T$=operating gas temperature (in degrees Kelvin, i.e., °K.=°C.+273.1);

$P$=average of absolute pressures taken on opposite sides of constriction plate (in pounds per square inch);

$M_w$=mol. weight of fluidizing gases;

wherein $C_m$ is in the order of 0.9.

10. A constriction plate construction having gas passage ducts for maintaining a bed of particles in a fluidized state by an upflowing stream of treatment gases passing through said ducts, which plate construction comprises refractory block units shaped and assembled so as to constitute together a self-supporting structure having a horizontal planar top face and a bottom face arched in cross-section, said block units being shaped so as to constitute tapered ducts between the interfaces of contiguous blocks with the narrow ends of the ducts constituting the outlet ends thereof, said ducts having different lengths increasing from a minimum length in the middle portion of the constriction plate construction to a maximum in the marginal portions thereof, wherein the effective outlet areas of said ducts are substantially alike, wherein the ratio of the sizes of the effective inlet areas to the size of the effective outlet areas of the ducts is from about 1.5:1 to about 3:1, while the effective axial length of the ducts is in a range from about 9″ to about 18″, and wherein the tapered shape of the ducts has an angle of convergence from about 2° to about 4½° determinable in a plane extending substantially transversely of the contiguous blocks and substantially containing the longitudinal axis of the ducts, whereby with sufficient gas pressure drop maintained across said constriction plate construction, there is maintained uniform gas flow distribution through said ducts.

11. The constriction plate construction according to claim 10, wherein the outlet area of the ducts is determinable from the formula:

$$Q_{T\ \&\ P}=4825 \cdot C_m \cdot A_2 \sqrt{\frac{(\Delta P_{T\ \&\ P}) \cdot T}{M_w \cdot P}}$$

Where:

$Q_{T\ \&\ P}$=gas flow at operating temperature and operating pressure (in cubic feet per minute);

$C_m$=discharge co-efficient of ducts;

$A_2$=true discharge area of ducts (in square feet);

$P_{T\ \&\ P}$=pressure drop between inlet and discharge duct areas for gas at operating temperature and operating pressure (in inches H₂O);

$T$ = operating gas temperature (in degrees Kelvin, i.e., °K.=°C.+273.1);

$P$ = average of absolute pressures taken on opposite sides of constriction plate (in pounds per square inch);

$M_w$ = mol. weight of fluidizing gases;

wherein $C_m$ is in the order of 0.9.

12. A constriction plate construction having gas passage ducts for maintaining a bed of particles in a fluidized state by an upflowing stream of treatment gases passing through said ducts, which plate construction comprises a self-supporting structure of refractory material having a horizontal planar top face and a bottom face arched in cross-section, wherein said ducts have different lengths increasing from a minimum length in the middle portion of the constriction plate construction to a maximum in the marginal portions thereof, and have tapered shape with the narrow ends thereof constituting the outlet ends, wherein the effective outlet areas of said ducts are substantially alike in the form of elongated openings, wherein the ratio of the sizes of the effective inlet areas to the size of the effective outlet areas of the ducts is from about 1.5:1 to about 3:1, while the effective axial length of the ducts is in a range from about 9″ to about 18″, and wherein the tapered shape of the ducts has an angle of convergence between said faces from about 2° to about 4½° determinable in a plane substantially transversely of said elongated outlet openings and substantially containing the longitudinal axis of the ducts, whereby with sufficient gas pressure drop maintained across said constriction plate construction, there is maintainable uniform gas flow distribution through said ducts.

13. The arrangement according to claim 12, wherein said tapered shape has flat faces opposite each other converging at the long sides of said elongated openings.

14. The constriction plate construction according to claim 12, wherein the outlet area of the ducts is determinable from the formula:

$$Q_{T \& P} = 4825 \cdot C_m \cdot A_2 \sqrt{\frac{(\Delta P_{T \& P}) \cdot T}{M_w \cdot P}}$$

Where:

$Q_{T \& P}$ = gas flow at operating temperature and operating pressure (in cubic feet per minute);

$C_m$ = discharge co-efficient of ducts;

$A_2$ = true discharge area of ducts (in square feet);

$P_{T \& P}$ = pressure drop between inlet and discharge duct areas for gas at operating temperature and operating pressure (in inches $H_2O$);

$T$ = operating gas temperature in degrees Kelvin, i.e., °K.=°C.+273.1);

$P$ = average of absolute pressures taken on opposite sides of constriction plate (in pounds per square inch);

$M_w$ = mol. weight of fluidizing gases;

wherein $C_m$ is in the order of 0.9.

15. A constriction plate construction having gas passage ducts for maintaining a bed of particles thereon in a fluidized state by an upflowing stream of treatment gases passing through said ducts, which plate construction comprises a self-supporting structure of refractory material having a planar top face and a bottom face arched in cross-section, said ducts having tapered shapes of different lengths increasing from a minimum length at the middle portion of the constriction plate construction to a maximum at the marginal portions thereof, the narrow ends of the ducts constituting the outlet ends with the effective outlet areas of said ducts substantially alike, wherein the ratio of the sizes of the effective inlet areas to the size of the effective outlet areas of the ducts is from about 1.5:1 to about 3:1, while the effective axial length of the ducts is in a range from about 9″ to about 18″, whereby with sufficient gas pressure drop maintained across said constriction plate construction, there is maintainable uniform gas flow distribution through said ducts.

16. The constriction plate construction according to claim 15, wherein the outlet area of the ducts is determinable from the formula:

$$Q_{T \& P} = 4825 \cdot C_m \cdot A_2 \sqrt{\frac{(\Delta P_{T \& P}) \cdot T}{M_w \cdot P}}$$

Where:

$Q_{T \& P}$ = gas flow at operating temperature and operating pressure (in cubic feet per minute);

$C_m$ = discharge co-efficient of ducts;

$A_2$ = true discharge area of ducts (in square feet);

$P_{T \& P}$ = pressure drop between inlet and discharge duct areas for gas at operating temperature and operating pressure (in inches $H_2O$);

$T$ = operating gas temperature in degrees Kelvin, i.e., °K.=°C.+273.1);

$P$ = average of absolute pressures taken on opposite sides of constriction plate (in pounds per square inch);

$M_w$ = mol. weight of fluidizing gases;

wherein $C_m$ is in the order of 0.9.

17. A constriction plate construction having gas passage ducts for maintaining a bed of particles thereon in a fluidized state by an upflowing stream of treatment gases passing through said ducts, which plate construction comprises refractory block units shaped and assembled so as to constitute together a self-supporting structure having a horizontal planar top face including the outlet orifices of the ducts, and a bottom face arched in cross-section including the inlet orifices of said ducts, said block units being shaped so as to constitute tapered ducts between the interfaces of contiguous block units, each block unit having in one side thereof a channel-shaped recess the effective end cross-sections of which together with the adjacent plane face of the respective contiguous block unit define the inlet area and the outlet area of a respective duct.

18. The constriction plate construction according to claim 17, wherein said recess has a plane bottom face opposite to and converging relative to said adjacent plane face.

19. The construction according to claim 17, wherein the ratio of the size of the effective outlet area to the sizes of the effective inlet areas of the ducts is from about 1.5:1 to about 3:1, while the effective axial length of the ducts is in a range from about 9″ in the middle to about 18″ at the marginal portions, and wherein the angle of convergence between the bottom of the recess and said face of said contiguous block is from about 2° to about 4½°, whereby with sufficient gas pressure drop maintained across said constriction plate construction, there is maintainable uniform gas flow distribution through said ducts.

20. The construction according to claim 17, wherein the ratio of the size of the effective outlet area to the sizes of the effective inlet areas of the ducts is from about 1.5:1 to about 3:1, while the effective axial length of the ducts is in a range from about 9″ in the middle to about 18″ at the marginal portions, whereby with sufficient gas pressure drop maintained across said constriction plate construction, there is maintainable uniform gas flow distribution through said ducts, said outlet area being determinable by the formula:

$$Q_{T \& P} = 4825 \cdot C_m \cdot A_2 \sqrt{\frac{(\Delta P_{T \& P}) \cdot T}{M_w \cdot P}}$$

Where:

$Q_{T \& P}$ = gas flow at operating temperature and operating pressure (in cubic feet per minute);

$C_m$ = discharge co-efficient of ducts;

$A_2$ = true discharge area of ducts (in square feet);

$P_{T \& P}$ = pressure drop between inlet and discharge duct areas for gas at operating temperature and operating pressure (in inches $H_2O$);

$T$ = operating gas temperature in degrees Kelvin, i.e., °K.=°C.+273.1);

$P$ = average of absolute pressures taken on opposite sides of constriction plate (in pounds per square inch);

$M_w$ = mol. weight of fluidizing gases;

wherein $C_m$ is in the order of 0.9.

References Cited in the file of this patent

UNITED STATES PATENTS

| | | |
|---|---|---|
| 2,465,410 | White | Mar. 29, 1949 |
| 2,487,984 | Rodman | Nov. 15, 1949 |
| 2,503,788 | White | Apr. 11, 1950 |
| 2,529,366 | Bauer | Nov. 7, 1950 |
| 2,608,474 | Gilliam | Aug. 26, 1952 |
| 2,684,840 | Behme et al. | July 27, 1954 |
| 2,789,034 | Swaine et al. | Apr. 16, 1957 |

FOREIGN PATENTS

| | | |
|---|---|---|
| 1,028,178 | France | May 20, 1953 |
| 1,028,191 | France | May 20, 1953 |